(12) United States Patent
Nakanishi et al.

(10) Patent No.: US 7,080,105 B2
(45) Date of Patent: Jul. 18, 2006

(54) SYSTEM AND METHOD FOR DATA BACKUP

(75) Inventors: Masashi Nakanishi, Yokohama (JP); Motoaki Hirabayashi, Yokohama (JP); Naoki Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 10/351,420

(22) Filed: Jan. 27, 2003

(65) Prior Publication Data

US 2003/0229653 A1   Dec. 11, 2003

(30) Foreign Application Priority Data

Jun. 6, 2002  (JP) .............................. 2002-165055
Nov. 26, 2002  (JP) .............................. 2002-341673

(51) Int. Cl.
*G06F 17/30* (2006.01)
(52) U.S. Cl. ...................................... 707/204; 707/200
(58) Field of Classification Search .............. 707/1–10, 707/100–104.1, 200–204; 711/162; 714/6; 703/2
See application file for complete search history.

(56) References Cited

U.S. PATENT DOCUMENTS

| | | | |
|---|---|---|---|
| 5,649,196 A * | 7/1997 | Woodhill et al. ........... 707/204 |
| 5,758,067 A | 5/1998 | Makinen et al. ............... 714/54 |
| 5,758,359 A | 5/1998 | Saxon ......................... 707/204 |
| 5,854,754 A * | 12/1998 | Cabrera et al. ................ 703/2 |
| 5,890,165 A | 3/1999 | Boudrie et al. ............. 707/202 |
| 6,330,570 B1 | 12/2001 | Crighton ..................... 707/204 |
| 6,487,644 B1 | 11/2002 | Huebsch et al. ............ 711/162 |
| 6,611,923 B1 * | 8/2003 | Mutalik et al. ................. 714/4 |
| 6,704,885 B1 | 3/2004 | Salas-Meza et al. ........... 714/6 |
| 6,748,447 B1 * | 6/2004 | Basani et al. ............... 709/244 |
| 6,785,786 B1 | 8/2004 | Gold et al. ................. 711/162 |
| 6,931,422 B1 * | 8/2005 | Gusler et al. ............... 707/204 |

FOREIGN PATENT DOCUMENTS

JP   8-44610   2/1996

* cited by examiner

*Primary Examiner*—Jeffrey Gaffin
*Assistant Examiner*—Yicun Wu
(74) *Attorney, Agent, or Firm*—Mattingly, Stanger, Malur & Brundidge, P.C.

(57) ABSTRACT

A backup or restore schedule is determined in an efficient manner. A backup definition creating unit in a management server reads a start time of a service managed by a job schedule unit, and sets a backup start time in a time zone in which the service is not executed.

7 Claims, 9 Drawing Sheets

FIG. 3

| SERVICE CODE (300) | SERVICE NAME (310) |
|---|---|
| G0000001 | (TOKYO) DAILY TOTALIZATION SERVICE |
| G0000002 | (OSAKA) DAILY TOTALIZATION SERVICE |
| G0000003 | (HEADQUARTER) WEEKLY SERVICE |
| G0000004 | (HEADQUARTER) MONTHLY SERVICE |

FIG. 4

| SERVICE CODE (400) | SERVICE FILE CODE (410) | JOB NAME (420) | HOST NAME (430) | FILE NAME (440) | SERVICE START TIME (450) | SERVICE END TIME (460) |
|---|---|---|---|---|---|---|
| G0000001 | F0000001 | JOB 1 | HOST A | aaaa.exe | 09:00:00 | 10:00:00 |
| G0000001 | F0000002 | JOB 1 | HOST A | aaaa.dat | 09:00:00 | 10:00:00 |
| G0000001 | F0000003 | JOB 2 | HOST A | bbbb.exe | 12:00:00 | 13:00:00 |
| G0000001 | F0000004 | JOB 3 | HOST B | cccc.exe | 15:00:00 | 17:00:00 |
| G0000002 | F0000005 | JOB 4 | HOST C | dddd.exe | 18:00:00 | 20:00:00 |
| G0000003 | F0000006 | JOB 5 | HOST B | cccc.exe | 20:00:00 | 21:00:00 |

FIG. 5

| SERVICE FILE CODE (500) | BACKUP START TIME (510) | BACKUP END TIME (520) | RESTORE START TIME (530) | RESTORE END TIME (540) | FILE SHARING SERVICE CODE (550) |
|---|---|---|---|---|---|
| F0000001 | 22:00:00 | 22:30:00 | — | — | — |
| F0000002 | 22:00:00 | 22:30:00 | — | — | — |
| F0000003 | 22:00:00 | 22:30:00 | — | — | — |
| F0000004 | 22:00:00 | 22:30:00 | — | — | G0000003 |
| F0000005 | 23:00:00 | 24:00:00 | 03:00:00 | 04:00:00 | — |
| F0000006 | — | — | — | — | G0000002 |

SYSTEM AND METHOD FOR DATA BACKUP

BACKGROUND OF THE INVENTION

The present invention relates to techniques for backing up and restoring data.

A conventional data backup method is described, for example, in JP-A-5-289922, which discloses that a file backup timing is detected from file backup management information on each of files in a backup management file, and from a job schedule situation and a task execution situation acquired from a job management means, to generate interrupt instruction information.

Recent systems employ an approach called distributed processing which distributes a single service to a plurality of computers for processing. In such a distributed processing environment, it is necessary to know a location where a data file or an execution file to be backed up is placed. However, general services and data protection such as backup are not managed by the same person or in the same department, but different persons are in charge of respective works. Thus, a person in charge of data protection must look for data to be backed up and their locations. However, this would take a significant time, taking into account an enormous amount of data at present and a possible increase in the amount of data in the future. In addition, resources such as backup media are also required for storing such an enormous amount of data.

SUMMARY OF THE INVENTION

The aforementioned prior art does not disclose a backup operation in a distributed processing environment.

It is therefore an object of the present invention to provide a system and method for data backup or restore which are capable of efficiently backing up data in a distributed processing environment.

To achieve the above object, a data backup method according to the present invention identifies a file utilized in a service which is intended for a backup, and a storage device which stores this file, and determines a schedule for backing up the identified file from service schedule information.

BRIEF DESCRIPTION OF THE DRAWINGS

FIG. 3 shows an exemplary service name management table;

FIG. 4 shows an exemplary service file information management table;

FIG. 5 shows an exemplary backup file information management table;

DESCRIPTION OF THE EMBODIMENTS

In the following, one embodiment of the present invention will be described with reference to the accompanying drawings.

Figure 1:
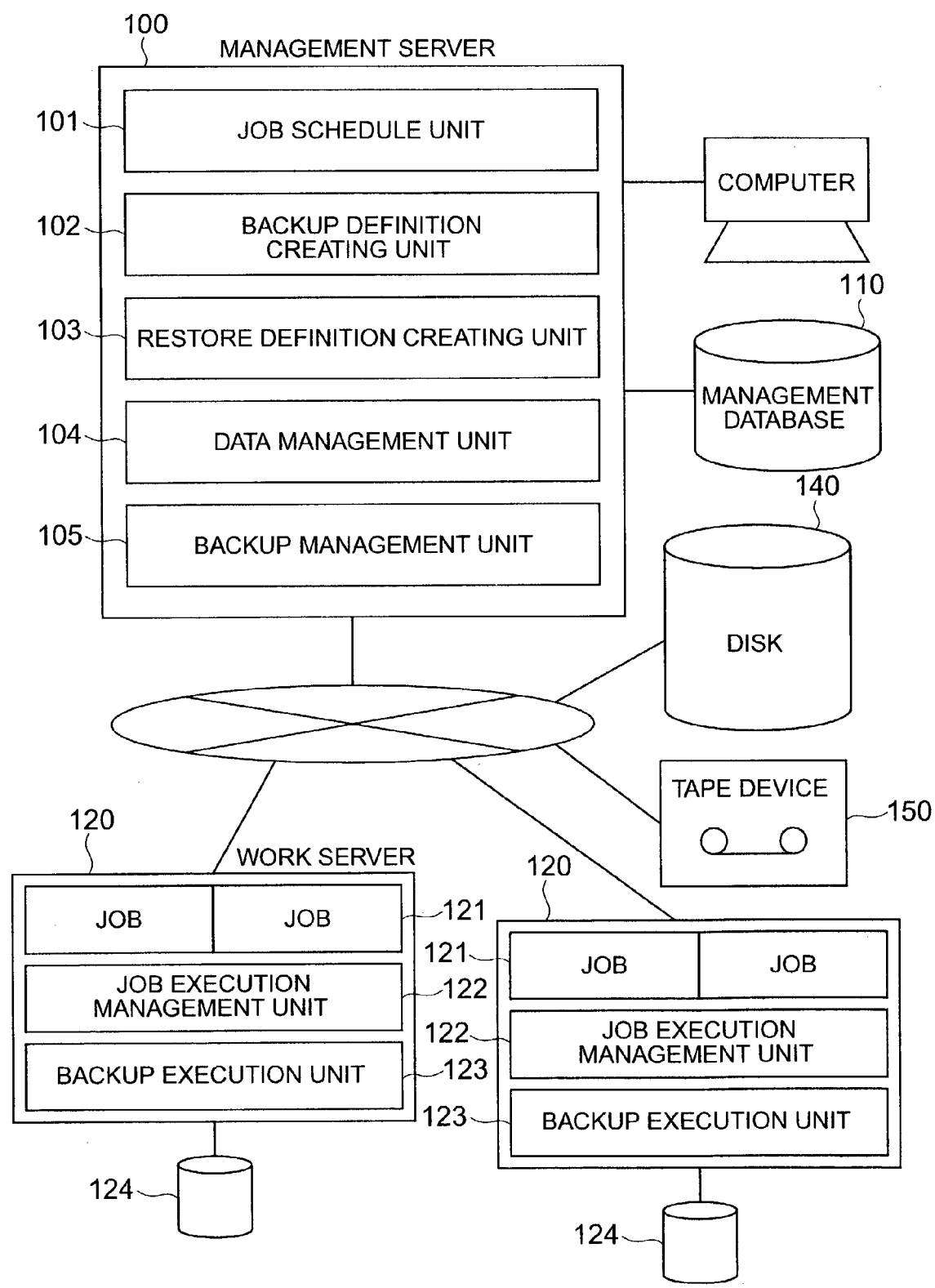
FIG. 1 is a block diagram illustrating the configuration of an exemplary system according to the present invention.

FIG. 1 illustrates the configuration of an exemplary system to which the present invention is applied. The illustrated system is configured to backup and restore data stored in a storage device on a service-by-service basis.

As illustrated in FIG. 1, this system comprises a management server 100, work servers 120, a disk device 140 which is a storage device, and a tape device 150. These devices are connected to a network.

The management server 100 comprises a job schedule unit 101, a backup definition creating unit 102, a restore definition creating unit 103, a data management unit 104, and a backup management unit 105. The job schedule unit 101 manages a schedule for executing jobs which make up a service, and instructs each of the work server 120 to execute jobs based on the schedule. The backup definition creating unit 102 defines a schedule for performing backup operations from file information associated with the execution of a service and a service execution time, such that the backup operations will not fall within a time zone in which the service is executed. The restore definition creating unit 103 acquires file information associated with a service, for which a backup operation has been performed, from a management database 110 to define a schedule for restore operations. The data management unit 104 registers and manages file information acquired from the job schedule unit 101, the service execution time, and the backup and restore scheduling information defined by the backup definition creating unit 102 and restore definition creating unit 103, respectively. The backup management unit 105, which is implemented in software for executing a backup operation, instructs each of the work server 120 to execute a backup and a restore operation, respectively, based on the definitions created by the backup definition creating unit 102 and restore definition creating unit 103.

The management database 110 connected to the management server 100 comprises a service name table, a service file information table, and a backup file information table. Each of the work server 120, which is a host computer connected to a network in which a service is executed in a distributed processing environment, comprises jobs 121, a job execution management unit 122, and a backup execution unit 123. The job execution management unit 122 selects a job for execution in accordance with an execution instruction, which specifies a service name and a job name, sent from the management server 100. The backup execution unit 123, which is implemented in software for making backup copies, backs up data in accordance with a backup execution instruction from the management server 100. Local disks 124 are storage devices connected to work servers 120 associated therewith for preserving data used in services in the form of files.

The disk device 140 may be a large disk array device connected to the network for preserving files used in services, and files which have been backed up.

The tape device 150 is a magnetic tape device connected to the network for preserving files which have been backed up.

Figure 2A:
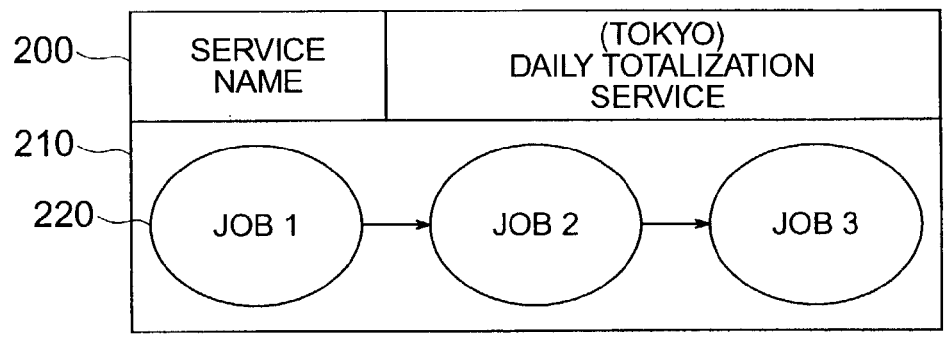
FIGS. 2A and 2B are diagrams illustrating the structure of an exemplary service.
Figure 2B:
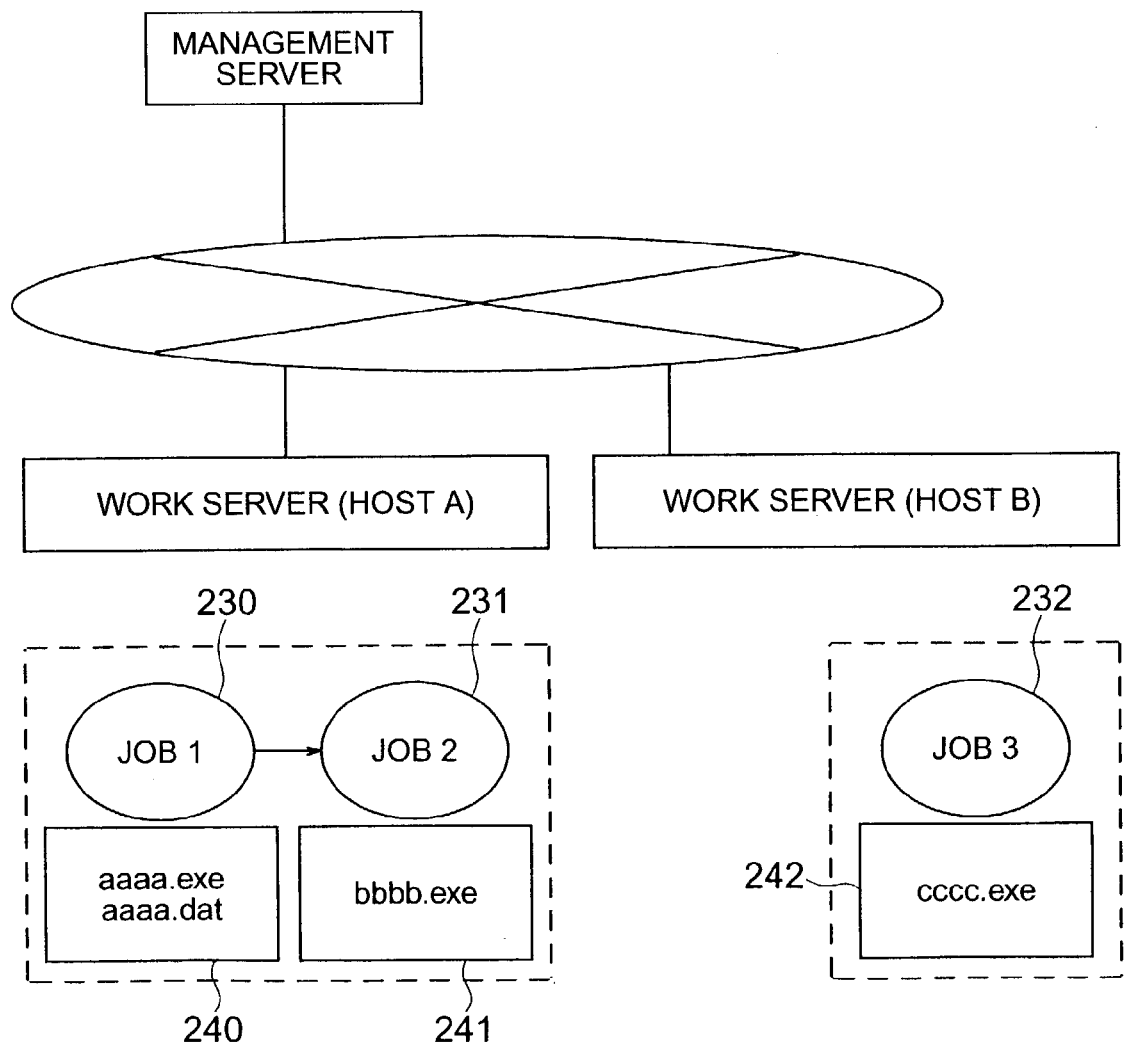

FIGS. 2A and 2B show how a service is executed in a distributed processing environment. As illustrated in FIG. 2A, when a service executed in the distributed processing environment is made up of a plurality of jobs, respective jobs are displayed such that they are connected through the network. Such a network comprised of jobs connected therein is hereinafter called the "job-net." Upon completion of processing, a certain job which forms part of a job-net takes over the result of the processing to another job, and transmits the status (under execution, complete, abortion due to error, or the like) of the job to the other job. Alternatively, any other method may be used for associating one or a plurality of jobs with one another.

A service name 200, which identifies the name of a service managed on the management server 100, defines a job-net 210. The job-net 210 indicates a sequential flow of the service consisting of a plurality of jobs 220, and defines the order of the jobs. Each of the jobs 220, represents a process of the service, and defines an execution file and a data file.

FIG. 2B shows how the service represented by FIG. 2A is executed on the system. FIG. 2B shows definitions of the job-net 210 for "(Tokyo) Dairy Totalization Service" identified in the service name 200. Specifically, shown herein is that "Host A" processes "Job 1" indicated by 230 using files "aaaa.exe" and "aaaa.dat" indicated by 240.

Next, "Host A" processes "Job 2" indicated by 231 using a file "bbbb.exe" indicated by 241, and then "Host B" processes "Job 3" indicated by 232 using a file "cccc.exe" indicated by 242.

FIGS. 3, 4, 5 are data registered in the management database 110 by the data management unit 104.

FIG. 3 shows an exemplary service name table which holds a service code 300 in correspondence to each service name 310. The service name table sets a key on the service codes 300 for managing the service names.

FIG. 4 shows an exemplary service file information table. The service file information table contains a file used in a service identified by each service code 400 in a column named "service file code" 410, and holds a job name 420, a host name 430, a file name 440, a service start time 450, and a service end time 460 corresponding to each service file code 410. The service file information table sets a key on the service file code 410 for management.

The data management unit 104 acquires service names, job names, host names, file names, service start times, and service end times from the job schedule unit 101, and registers the data as shown in FIGS. 3 and 4. Specifically, the data management unit 104 assigns service codes to read services in order, and registers the data as shown in FIG. 3. The data management unit 104 also acquires a job name, a host name, a file name, a service start time, and a service end time of each service, assigns a service file code to the file name in sequence, and registers the data as shown in FIG. 4. While the job execution schedule unit 101 manages the service name, job name, host name, file name, service start time, and service end time in the description made herein, the file names may be managed only by the work server 120. In this configuration, the data management unit 104 sends the service name and job name to the work server 120 which is to execute the service based on the host name, and acquires the associated file name from this work server 120. The job execution management unit 122 of the work server 120 identifies a file from the service name and job name sent thereto, and sends the name of the identified file to the management server 100.

Generally, the job execution management unit 122 manages the execution of jobs by the work server 120 in accordance with a job execution instruction sent from the management server 100. The job execution management unit 122 monitors accesses to files, caused by the execution of a job, and manages the service, job and files in correspondence. In this way, the job execution management unit 122 can identify a file to be used from the service name and job name sent thereto from the management server 100.

FIG. 5 shows an exemplary backup file information table. The backup file information table holds a service file code 500, a backup start time 510, a backup end time 520, a restore start time 530, a restore end time 540, and a file sharing service 550. The backup file information table sets a key on the service file code for management. The data management unit 104 registers definition information created in the backup definition creating unit 102 or definition information created in the restore definition creating unit 103 as shown in FIG. 5. The backup start time 510 and backup end time 520 in FIG. 5 indicate the times at which instructions associated with backup operations are issued to a variety of storage devices and computers.

For example, for a file identified by a service file code "F0000004" in FIG. 5, an instruction is issued at "22:00:00" for starting a backup which is scheduled to be ended at "22:30:00." The file identified by the service file code "F0000004" is assigned a file sharing service code "G0000003," thus showing that this file is also used in a job named "Job 5" defined by a service code "G0000003."

These FIGS. 3, 4, 5 show the following definitions. The service named "(Tokyo) Dairy Totalization Service" is managed with a service code "G00000001." "Host A" is instructed to execute a job named "Job 1" at a service start time "09:00:00" using a file "aaaa.exe" managed with the service file code "F00000001" and a file "aaaa.dat" managed with the service file code "F00000002." An instruction is issued to start backing up the respective files at a backup start time "22:00:00."

Next, description will be made on how definition information is created for instructing a backup operation on a service-by-service basis. The definition information is created by the backup definition creating unit 102 which executes a procedure illustrated in FIG. 6. The procedure illustrated in FIG. 6 starts the processing (1) in response to an instruction entered by the user, (2) in response to an instruction issued by the job schedule unit 101 to execute a service, (3) in response to an instruction from another processing unit, or (4) every predetermined time.

Here, an instruction issued by the job schedule unit 101 refers to a service execution instruction issued by the job schedule unit 101 to the work server 120, by way of example, for forcing the backup definition creating unit 102 to monitor the execution instruction such that the processing is started at the time the execution instruction is issued. When service execution instructions are frequently issued, a predetermined threshold may be determined such that the processing is started when the number of issued service execution instructions exceeds the threshold. Service execution instructions issued by the job schedule unit 101 are in several patterns, for example, one having a host name and a job name, one having a host name, a job name and a service name, and one having a host name and a service name. In which pattern a service execution instruction is used depends on whether the job execution management unit 121 of the work server 120 can identify a particular job in a particular service.

For example, when one job is executed by a work server and shared by a plurality of services, the associated service execution instruction has a host name, a job name and a service name. Even if a job is shared by a plurality of services, a service execution instruction associated with this job has a host name and a job name when the job is executed by a different server for each service. These are mere examples of service execution instructions.

The following description will be made on the procedure illustrated in FIG. 6. First, the backup definition creating unit 102 identifies the name of a service for which a backup definition is created. The identification of the name of a service differs depending on how the procedure is started, as previously mentioned. Specifically, when the procedure is started in response to an input from the user, the service name is identified by that entered by the user. When the procedure is started in response to a service execution instruction issued from the job schedule unit 101, the service name is identified by this service execution instruction. When a service execution instruction has a host name and a job name, the service name is identified based on the table of FIG. 4. When the procedure is started every predetermined time, service names are identified in the order in which they are registered in the table shown in FIG. 3.

Next, the backup definition creating unit 102 reads a file name, a service start time, and a service end time from the management database 110 based on the identified service name (step 601). Then, the backup definition creating unit 102 determines, using the service file table shown in FIG. 4, whether or not a read file is used (shared) by any other service (step 602). When used by any other service ("Y" at step 602), the backup definition creating unit 102 determines whether or not a backup start time has been set for the file with reference to the backup file information table in FIG. 5 (step 603). When the backup start time has already been set for this file, the file is removed from those files which are scheduled to be backed up (step 604).

When no backup start time has been set for the file, the backup definition creating unit 102 reads an execution start time and an execution end time of another service which uses this file from the management database 110 (step 606). When the processing is not completed for all files, the backup definition creating unit 102 returns to step 602 ("Y" at step 605).

Upon completion of steps 602–605 for all files, the backup definition creating unit 102 determines a backup start time for the service identified at step 600 based on the service start time and service end time read at step 606 (step 607). The backup start time is determined in the following manner. First, the backup definition creating unit 102 finds a service execution time zone from the service start time and service end time for the service of interest at step 601. Next, if there is any service which shares the file, the backup definition creating unit 102 finds a service execution time zone for the service which shares the file from the service start time and service end time of the service which shares the file, as these times have been read at step 602.

Next, the backup definition creating unit 102 calculates a time required for a backup operation (backup execution time zone). A time required for a backup operation may be previously determined for each file, or a time required by each file for a backup operation may be calculated from its file size. Then, the backup definition creating unit 102 determines a backup start time such that the found service execution time zone does not overlap the backup execution time zone. Specifically, the backup definition creating unit 102 defines the backup start time except for the service execution time zone, and calculates the backup end time from the backup execution time zone. Then, the backup start time is established if the service execution time zone is not included between the backup start time and backup end time. On the other hand, if the service execution time zone is included between the backup start time and backup end time, the backup definition creating unit 102 changes the backup start time, and confirms in the same manner whether the service execution time zone is not included between the backup start time and backup end time.

As the backup start time and backup end time are determined at step 607 ("Y" at step 608), the backup definition creating unit 102 sends the determined backup start time and backup end time to the data management unit 104 (step 609).

On the other hand, when the backup start time has not been selected even after the lapse of a predetermined time ("N" at step 608), the backup definition creating unit 102 reads a job start time and a job end time of a job associated with a file (shared file) used by another service from the management database 110 (step 610), and determines the backup start time in a manner similar to step 607 based on the identified service and an execution time zone of the job which uses the shared file (step 611). While the backup start time is determined at step 607 in the execution time zone of the service which shares the file, step 611 differs in that the backup start time is determined in an execution time zone of the job which shares the file. As the backup start time and backup end time are determined at step 611, the backup definition creating unit 102 passes the determined backup start time and backup end time to the data management unit 104 (step 609).

On the other hand, when the backup start time has not been selected even after the lapse of a predetermined time ("N" at step 612), the backup definition creating unit 102 displays options for processing to be executed, and waits for a selection made by the user (step 613). The following three options are displayed for the user.

Figure 7:
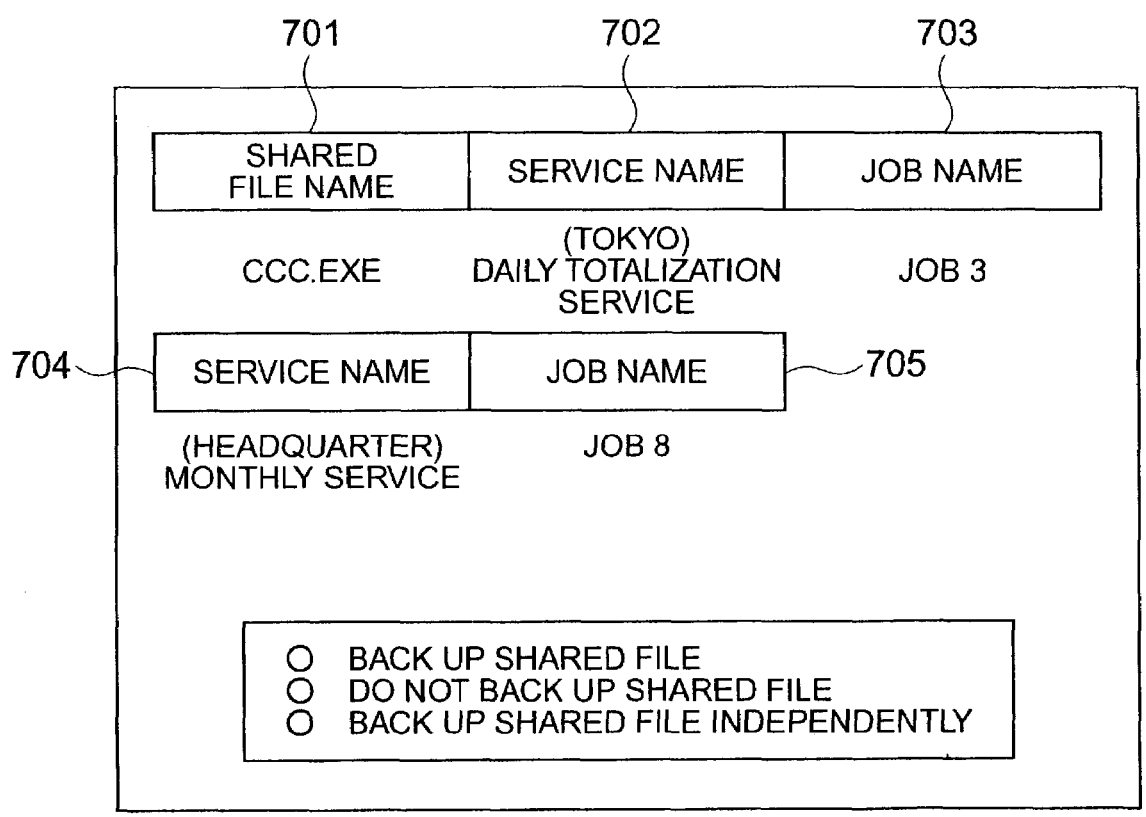
FIG. 7 is a diagram showing an example of displayed screen.

FIG. 7 illustrates an exemplary screen which is displayed for the user to select one from the options. The screen illustrated herein displays a shared file name 701, a service name 702 identified at step 601, a job name 703 associated with the service which uses a shared file, as identified by the service name 702, a sharing service name 704, a job name 705 associated with the service which uses the shared file, as identified by the sharing service name 704. The screen also displays the three options for the user: "Back up Shared File," "Do Not Back up Shared File" and "Back up Shared File Independently."

When the user selects "Back up Shared File," the backup start time is determined only in consideration of the service start time and service end time of the service name 702 (option 1). Specifically, the service indicated by the service name 702 and the job indicated by the job name 703 are stopped for backing up the shared file. When the user selects "Do Not Back up Shared File," the backup start time is determined only in consideration of the service start time and service execution end time of the service name 702 except for the shared file (option 2). When this option is selected, the shared file may be included in other files used by the service indicated by the service name 704 and backed up together with these files. When the user selects "Back up Shared File Independently," the backup definition creating unit 102 reads the job start times and job end times of all jobs associated with the shared file from the management database 110 to determine the backup start time and backup end time (option 3). In this event, the backup start time and backup end time are determined for each file except for the shared file in a manner similar to the option 2.

Figure 6:
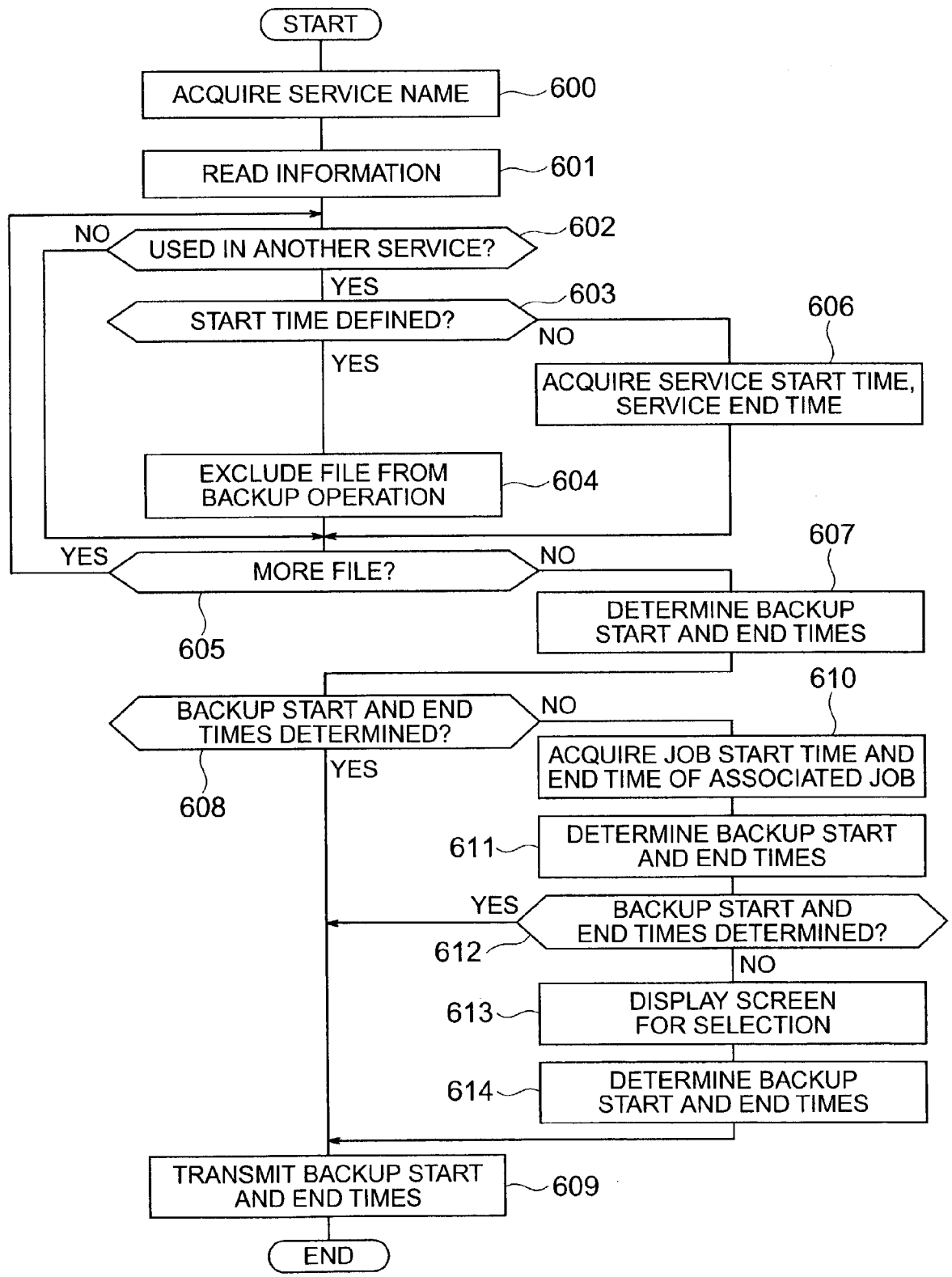
FIG. 6 is a flow chart illustrating an exemplary procedure for creating a definition for a backup operation.

At step 613 in FIG. 6, any of the foregoing options 1, 2, 3 is executed in response to the selection made by the user to determine the backup start time and backup end time which are then sent to the data management unit 104.

The backup management unit 105 monitors the backup file information table of the management database 110 for a file to be backed up, and reads the host name and service code shown in FIG. 4 based on the service file code, if any such file is found, to instruct the work server 120 to back up the file. Upon receipt of a report from the work server 120 that the file has been successfully backed up, the backup management unit 105 registers the backup file information table with information indicating that the file has been backed up.

As described above, the backup definition creating unit 102 basically determines, through the foregoing procedure, the backup start time and backup end time for a file on a service-by-service basis even if the file is used by a plurality of services or jobs. When a file is used by a plurality of services or jobs so that the backup start time cannot be determined, the user is prompted to select an option for the backup operation, making it possible to back up the file efficiently for the user. Specifically, since the user can stop a service for selecting whether or not a file should be backed up on a service-by-service basis, the user can select an appropriate option for the backup operation depending on the importance of a particular service.

While in the foregoing procedure, the user is prompted to select an option at step 613, no query is needed for the user if priorities have been previously determined such that a backup start time is determined in accordance with the priorities at step 614, and step 609 is executed at the time the backup start time is determined.

Figure 8:
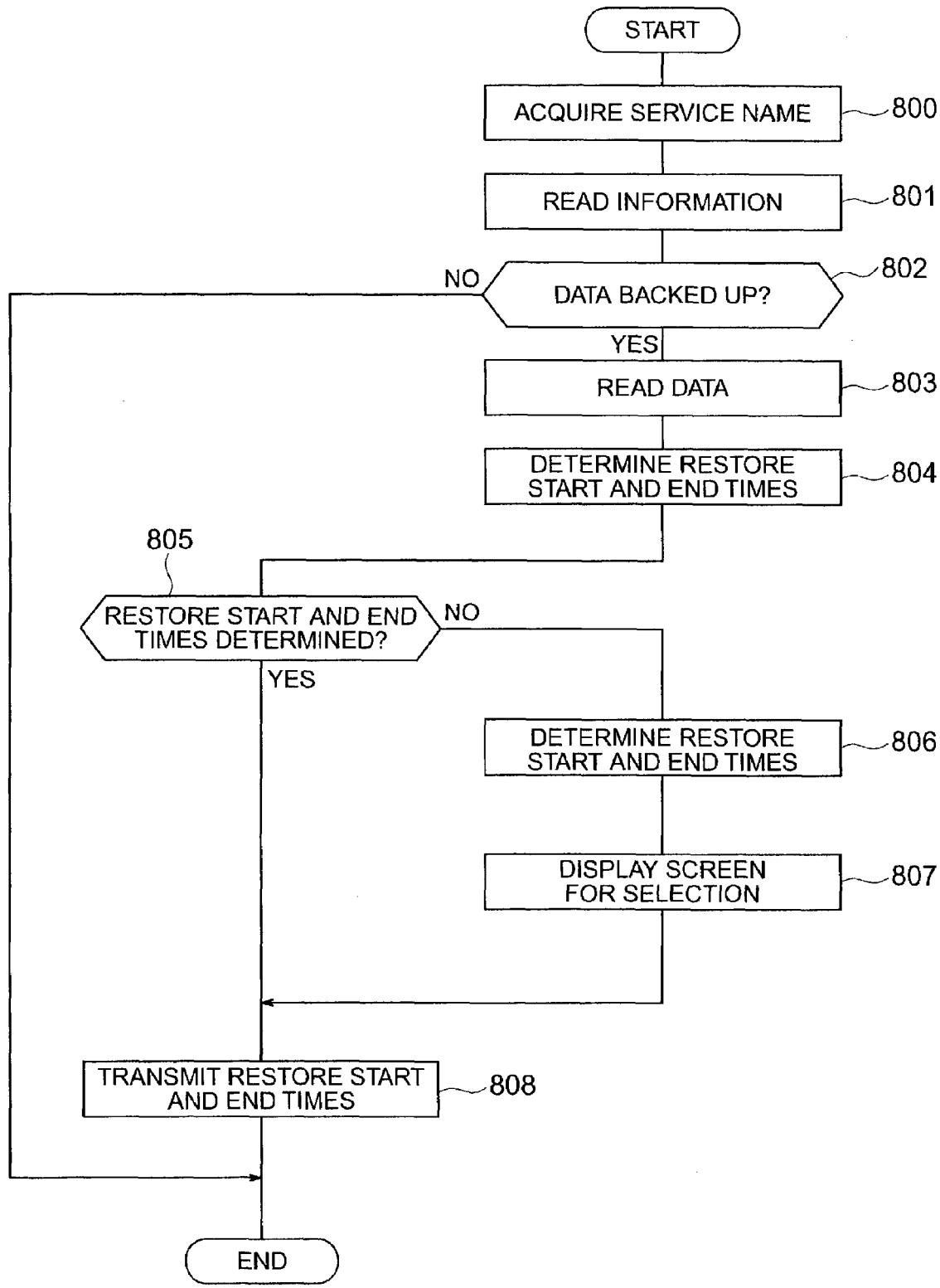
FIG. 8 is a flow chart illustrating an exemplary procedure for creating a definition for a restore.

Next, description will be made on how definition information is created for performing a restore operation on a service-by-service basis. FIG. 8 illustrates a procedure executed by the restore definition creating unit 103 for creating the definition information.

The user specifies the name of a service for which restore definition information is created (step 800). Next, the restore definition creating unit 103 reads file information and backup file information for the specified service stored on the management database 110 (step 801). Then, the restore definition creating unit 103 determines whether or not the read file has been backed up (step 802), and proceeds to determination of a restore start time if the file has been backed up.

First, the restore definition creating unit 103 reads a service start time, a service end time, a backup start time and a backup end time of the specified service. Since a file associated with the specified service can be used by any other service, the restore definition creating unit 103 reads a service start time, a service end time, a file backup start time, a file backup end time of another service which uses the file of the specified service (step 803). Next, the restore definition creating unit 103 sets a restore start time to avoid overlapping with a service execution time zone defined by the read service start time and service end time and with a backup execution time zone defined by the backup start time and backup end time (step 804). The determination of the restore start time is made in a manner similar to the aforementioned step 607. Specifically, the restore start time is selected such that a restore operation is started and ended within a time zone which excludes the service and backup execution time zones. While a time required for the restore operation should be taken into consideration for determining the restore start time, a predetermined time is previously given therefor. Alternatively, the time required for the restore operation may be estimated from the size of the file. As the restore start time and restore end time are determined at step 804, the restore definition creating unit 103 sends them to the data management unit 104 (step 805).

On the other hand, if no restore start time is selected even after the lapse of a predetermined time ("N" at step 805), the restore start time is determined at step 806 in the following manner.

First, the restore start time is determined only in consideration of the service execution time zone except for the backup execution time zone (sub-step 1). Next, the restore start time is determined without taking into consideration the job which shares the file (sub-step 2). In this event, for example, when "(Tokyo) Dairy Totalization Service" is specified and is associated with Job 4 and Job 5, with a backup execution time zone already determined, a restore start time is determined in consideration of the execution time zones of "(Tokyo) Dairy Totalization Service" and Job 4 and the backup execution time zone, and a restore start time is determined in consideration of the execution time zones of "(Tokyo) Dairy Totalization Service" and Job 5 and the backup execution time zone.

Next, at step 807, the restore definition creating unit 103 displays the restore start times determined at step 806 for prompting the user to select one. As the user selects a restore start time, the restore definition creating unit 103 sends the selected restore start time and restore end time to the data management unit 104. If no restore start time can be determined at step 806, the restore definition creating unit 103 displays "Is the restore given higher priority to other services?" As the user agrees to this proposal, the restore definition creating unit 103 selects a restore start time and a restore end time only in consideration of the execution time of the specified service, i.e., excluding the execution time zone of the specified service, and sends the selected restore start time and restore end time to the data management unit 104.

The backup management unit 105 monitors the backup file information table created in the management database 110, and sends a data restore execution instruction to the work server 120 based on the restore start time. A host name and a service name required for the instruction are determined based on the service file table shown in FIG. 4.

Upon receipt of a report from the work server 120 of the end of the restore operation, the backup management unit 105 deletes the definition on this restore operation from the backup file information table.

In this way, the data restore is also executed on a service-by-service basis, a service can be started earlier than when the data restore is executed on a disk-by-disk basis or the like.

The job schedule unit 100, backup definition creating unit 102, restore definition creating unit 103, data management unit 104, and backup management unit 105 shown in FIG. 1 may be implemented by software programs which can be executed by a processing unit such as a CPU of a server to perform their respective functions.

In addition, the backup definition creating unit 102, restore definition creating unit 103, and data management unit 104 may be integrated into a single software program. In this way, the resulting software program can associate and execute separate software programs such as the job schedule unit 100 and backup management unit 105, thereby accomplishing a combination of a software part for executing a variety of job schedules with a software part for managing backup operations.

As described above, the system according to the present invention can determine a backup definition for each service from file information and a service execution time to create the backup definition and execute a backup operation, so that the system is less burdened with the creation of backup definition which has been conventionally charged thereon.

Also advantageously, the execution of backup and restore operations on a service-by-service basis can reduce a time required therefor and save resources such as backup media.

Figure 9:
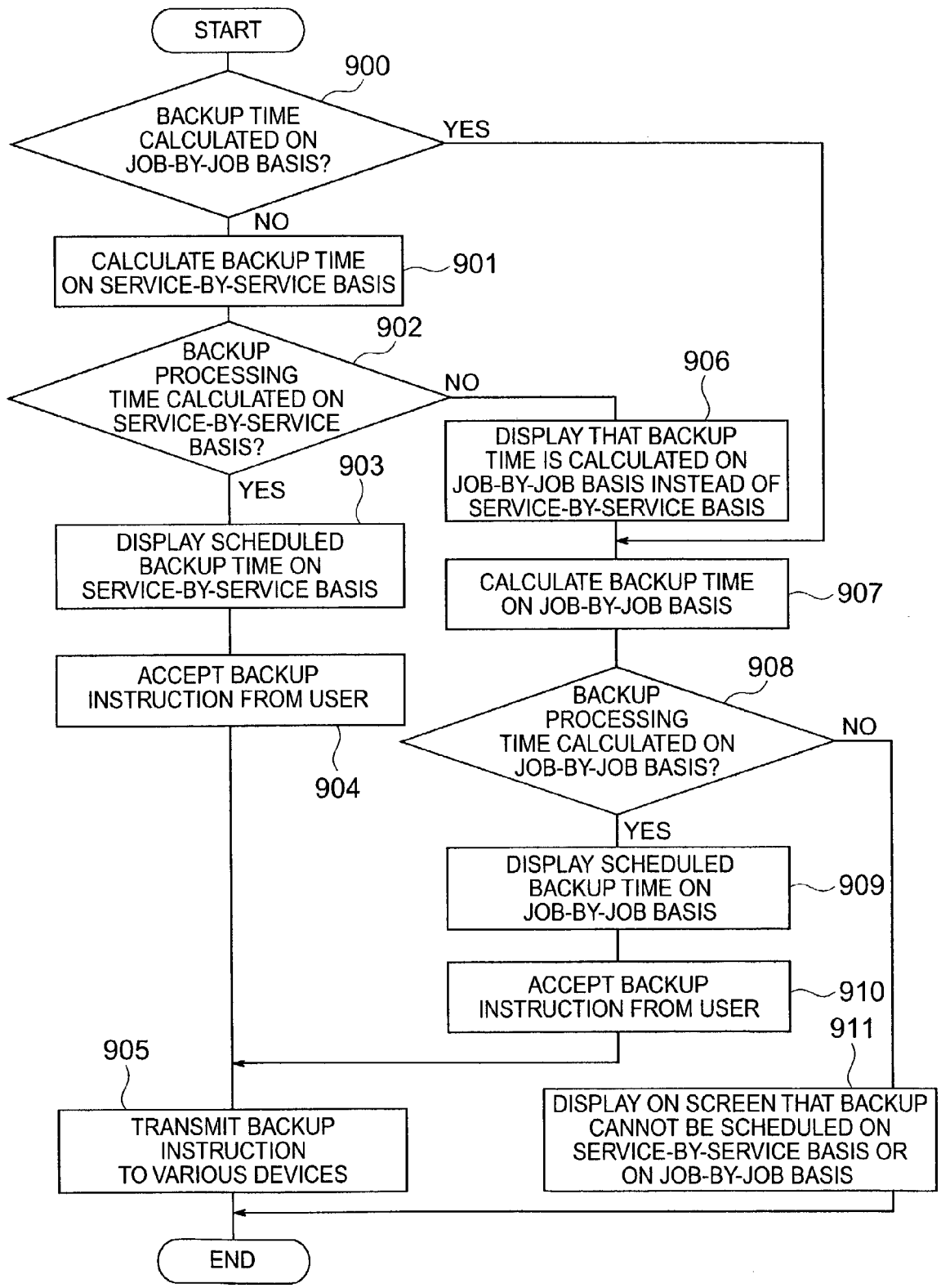
FIG. 9 is a flow chart illustrating an exemplary procedure for displaying a schedule and accepting inputs from a user.

Another embodiment is illustrated with reference to FIGS. 9 and 10. Described first is a procedure illustrated in FIG. 9.

First, the management server 100 accepts an instruction from the user as to whether or not a backup time is calculated on a job-by-job basis (step 900). When the user does not instruct the calculation of a backup time on a job-by-job basis, a backup operation is scheduled on a service-by-service basis. Alternatively, a service schedule may be displayed on the screen such that the backup definition creating unit 102 accepts the service name or service code of a service selected by the user from the displayed services.

Next, when the backup is not scheduled on a job-by-job basis ("No" at step 900), the backup definition creating unit 102 calculates a backup time for the service corresponding to the accepted service name on a service-by-service basis (step 901). The backup time may be calculated on a service-by-service basis through steps 601–607 in FIG. 6 or by any other method.

When the backup processing time can be calculated on a service-by-service basis ("Yes" at step 902), the backup definition creating unit 102 displays a scheduled backup time on a service-by-service basis on the screen (step 903). Then, the backup definition creating unit 102 accepts a backup execution instruction from the user (step 904), and transmits a backup instruction to a variety of devices based on the accepted instruction (step 905).

When the backup processing time cannot be calculated on a service-by-service basis ("No" at step 902), the backup definition creating unit 102 displays on the screen that a backup operation is performed on a job-by-job basis (step 906). Then, the backup definition creating unit 102 accepts a job name or a job code entered by the user, and calculates a backup time for a particular job corresponding to the accepted job name (step 907). The job-based backup time determination can be made through steps 610–614 in FIG. 6 or by any other method.

When the backup processing time can be calculated on a job-by-job basis ("Yes" at step 908), the backup definition creating unit 102 displays a scheduled backup time on a job-by-job basis (step 909). Then, the backup definition creating unit 102 accepts a backup execution instruction from the user (step 910), and transmits a backup instruction to a variety of devices based on the accepted instruction (step 905). When the backup processing time cannot be calculated on a job-by-job basis ("No" at step 908), the backup definition creating unit 102 displays on the screen that no backup operation can be scheduled on a service-by-service basis or on a job-by-job basis (step 911).

Exemplary displays on the screen will be described with reference to FIGS. 10A and 10B.

Figure 10A:
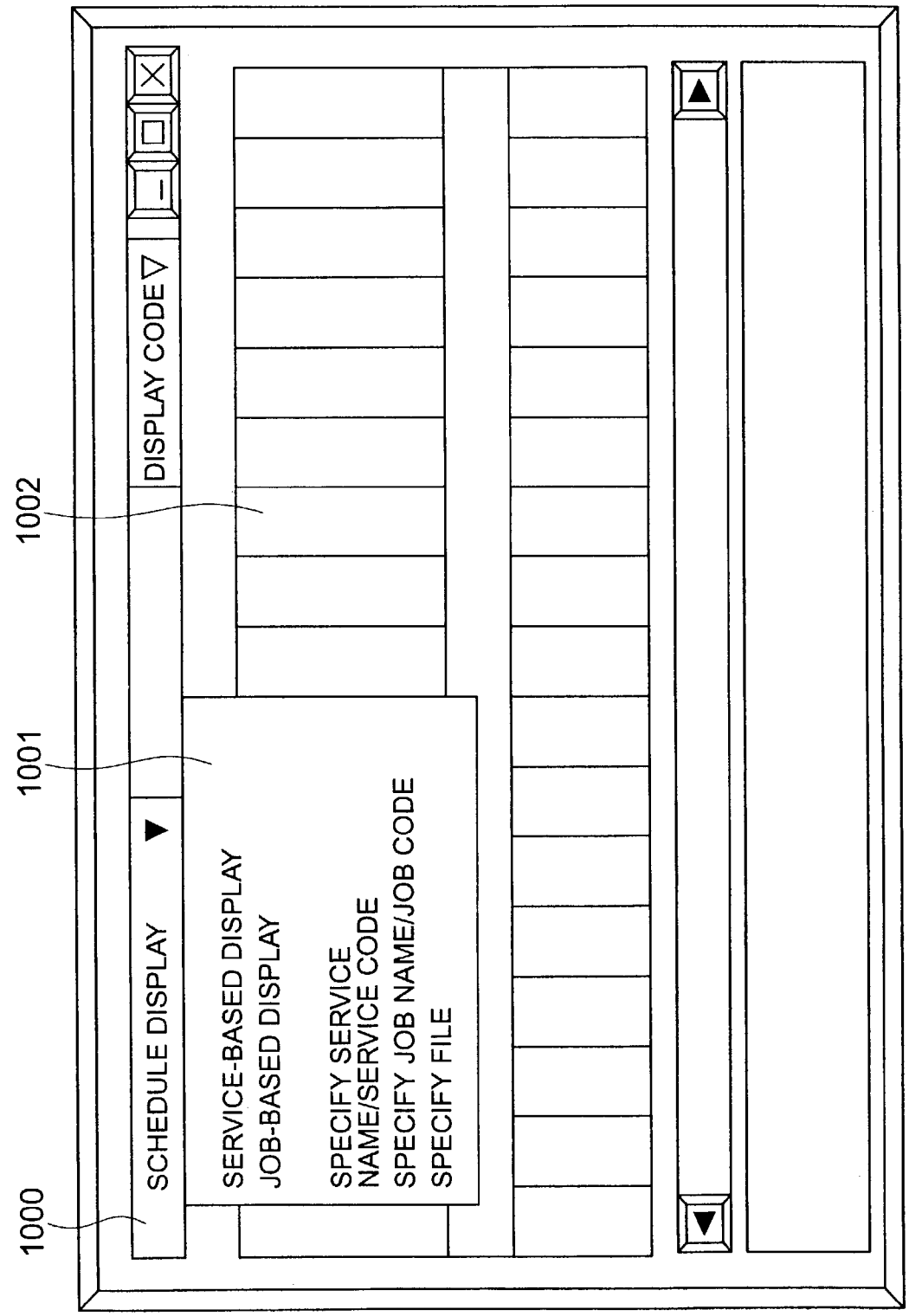
FIGS. 10A and 10B are diagrams showing examples of displayed screens.

FIG. 10A illustrates an exemplary screen for prompting the user to select a display of a backup schedule. As the user selects a backup schedule display button (1000), a window is displayed for prompting the user to select how the backup schedule should be displayed (1001). Based on contents selected by the user, a service schedule and a backup (restore) schedule are displayed on windows (1002 and the like).

Figure 10B:
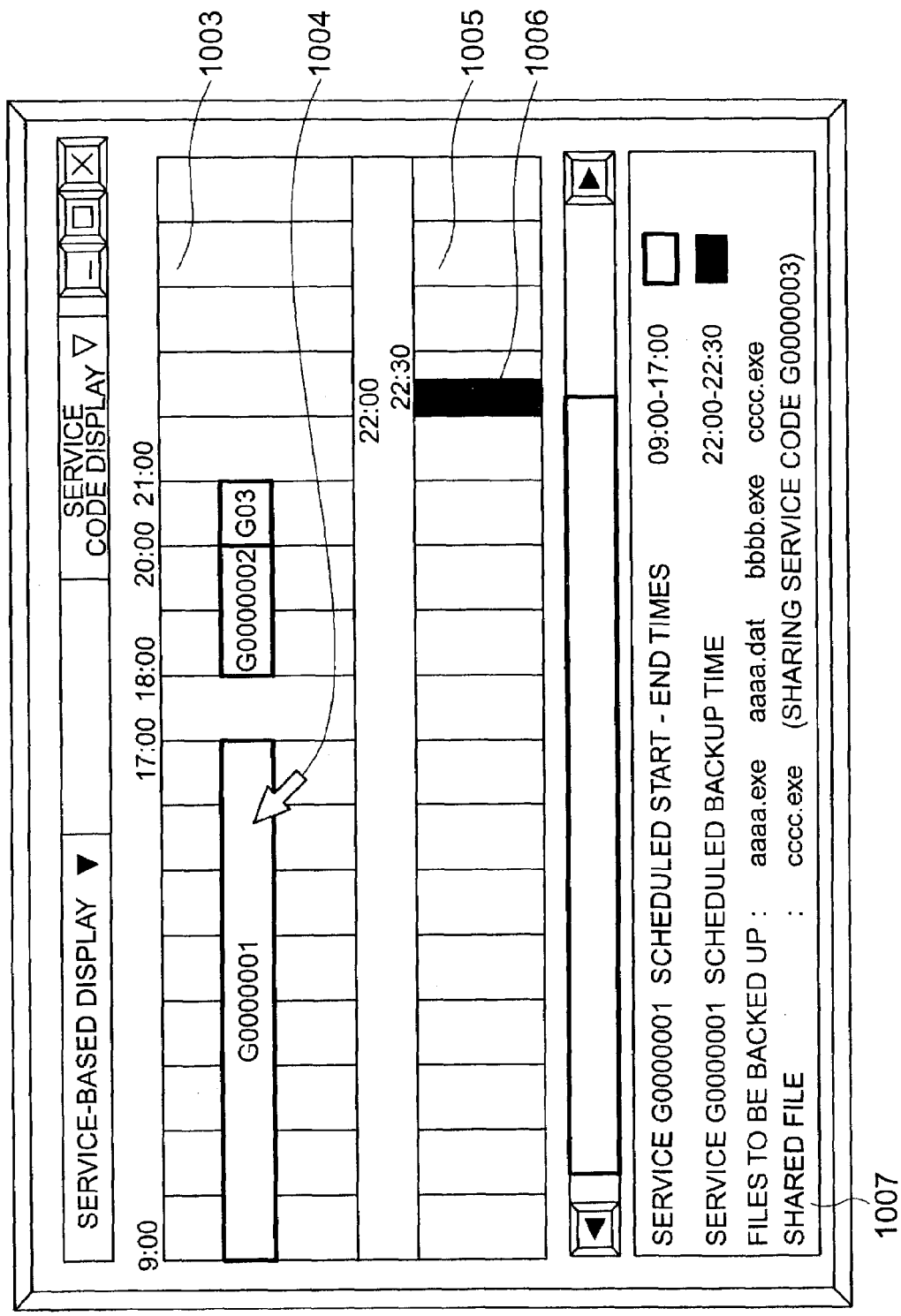

FIG. 10B illustrates an example which displays a backup schedule on a service-by-service basis based on the contents of FIGS. 4 and 5. An upper column (1003) on the window in FIG. 10B displays a service schedule in the form of a bar graph (rectangular regions or the like). While the exemplary service schedule displays a start time and an end time of a service corresponding to edges of a rectangle representative of the service, the service start time and end time may be displayed in any other manner. Also, while the exemplary display shows services by their service codes, service names may be displayed instead, or other identifiers of services can be displayed.

When the user selects a rectangular region having a service code "G0000001" displayed therein (1004) with a mouse pointer or the like, a scheduled backup time and the like (1006) corresponding to the service identified by the selected service code "G0000001" are displayed on a middle column (1005) of the window. A lower column (1007) of the window displays a start time and an end time of the service corresponding to the service name specified by the user, a list of files to be backed up in the service, a backup schedule for the files to be backed up in the service, a file shared with another service out of the files to be backed up, and the like.

While the exemplary display includes a rectangular shape representative of a service schedule to the right of the start and end times of the service such that the user can visually correspond the rectangular region representative of the service schedule displayed on the upper column (1003) of the window to the characters representative of the service on the lower column (1005) of the window, any other method may be employed for such a display. Likewise, for the rectangular region representative of the backup schedule displayed on the middle column (1005) of the window, and the contents described in the lower column (1007) of the window, the same pattern and shape representative of the schedule are illustrated to the right of the scheduled backup start and end times. Alternatively, any other method may be employed for the display.

The example shown herein involves displaying a service on the screen, accepting instructions from the user for the displayed service, and displaying information related to the service in response to the instructions. Additionally, other information may be displayed on the screen. For example, the screen may include a window for accepting an instruction from the user as to whether or not the contents of a backup instruction displayed on the screen are transmitted to a storage device, a computer or the like.

When the user specifies a rectangular region indicative of an execution time zone of a service with a mouse pointer or the like (1004), information related to the service may be displayed on the middle column (1005) and lower column (1007) of the window, respectively, in response to a detected coordinate position of the mouse pointer which enters the rectangular region representative of the execution time zone of the service displayed on the screen.

When the user specifies a rectangular region (1006) representative of the backup execution time zone with a mouse pointer or the like (for example, clicking a right button on the mouse), related information may be displayed. For example, details on a file which is backed up within the specified backup time zone may be displayed on a pop-up window or the like, or detailed information on jobs included in a service intended for a backup operation in the specified backup time zone, and/or the progress of the backup operation for files used in the jobs included in the service may be displayed on a separate window.

As appreciated, since the method of the present invention backs up files used in jobs included in a service on a service-by-service basis, the user is free from efforts of instructing a backup operation for each of files or programs used in each of the jobs included in the service. When a large number of jobs are included in a service, the user can save a time required for planning a backup schedule for each of files or programs used in the respective jobs.

Since a time zone scheduled for a backup operation and information on a shared file are displayed on a service-by-service basis with reference to information on a time required for backing up each of files or programs used in jobs included in a service and information on files shared by a plurality of services, the user can more readily find a time zone in which a backup time can be changed.

If backup operations cannot be scheduled on a service-by-service basis, they are scheduled on a job-by-job basis, so that when a service is processed using a plurality of files and programs, more efficient operations can be performed than when a backup operation is instructed for each file or program.

As appreciated, the present invention can accomplish an efficient data backup or restore operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A backup instructing method for backing up data stored in a storage device to another storage device both connected through a network to a management server and a plurality of work servers working under a distributed processing environment, comprising the steps of:
   acquiring a service name among a plurality of service names of services including jobs associated with each other for which a backup definition is to be created;
   identifying files included in jobs for said service name acquired, and a storage device among a plurality of storage devices connected to said network which stores the files;
   determining, after excluding any file from said identified files used by another service and backed up, a schedule for backing up said files in a time zone in which a service having said service name acquired is not executed by referring to a table having a service time of said service name acquired, and a storage device for storing said files; and
   transmitting an instruction for backing up said files to said determined storage device based on the determined schedule.

2. A backup instructing method according to claim 1, wherein said step of determining a schedule for backing up said file includes:
   determining the schedule to back up said identified file together with other files used by said service when said identified file is used by another service and is not backed up in said other service.

3. A method of setting a schedule for backing up data stored in a storage device to another storage device, said method comprising the steps of:
   identifying an associated file for each of the services executed by at least one computer; and
   determining a schedule for backing up said file associated with each service from schedule information determined for each said service.

4. A method of setting a schedule for backing up data according to claim 3, wherein said step of determining a schedule includes:
   determining the schedule to back up said identified file together with other files used by said service when said identified file is used by another service and is not backed up in said other service.

5. The backup instructing method according to claim 1, wherein said files are identified by an instruction from either a user's input in said management server, a job schedule unit of said management server, or another processing unit connected to said network thereby to identify said files.

6. The backup instructing method according to claim 1, wherein said determining step includes substeps of:
   displaying, when said time zone cannot be found, a request for a user to select an option among stopping said service having said service name, not backing up said files, and independently backing up each of said files; and
   determining not to back up said files when said option of not backing up is selected by the user.

7. The backup instructing method according to claim 6, wherein said files are identified by an instruction from either a user's input in said management server, a job schedule unit of said management server, or another processing unit connected to said network thereby to identify said files.

* * * * *